United States Patent [19]
Guinther

[11] 3,881,757
[45] May 6, 1975

[54] KNOT TYING IMPLEMENT

[75] Inventor: Rudolph Guinther, Clifton, N.J.

[73] Assignee: Lawrence Peska Associates, Inc., New York, N.Y. ; a part interest

[22] Filed: May 13, 1974

[21] Appl. No.: 469,285

[52] U.S. Cl. .................................................. 289/17
[51] Int. Cl. .............................................. D03j 3/00
[58] Field of Search ............................... 289/1.5, 17

[56] References Cited
UNITED STATES PATENTS
| | | | |
|---|---|---|---|
| 1,481,754 | 1/1924 | Stalson................................... | 289/17 |
| 2,646,298 | 7/1953 | Leary..................................... | 289/1.5 |
| 3,169,787 | 2/1965 | Zolezzi................................... | 289/17 |
| 3,700,272 | 10/1972 | Bauer..................................... | 289/17 |

*Primary Examiner*—Louis K. Rimrodt

[57] ABSTRACT

Described is an implement for tying knots on a fishing line and the like which has a central member holding on each face thereof a gripper blade retaining a single strand of leader. The upper part of the central member has a loop-receiving cavity and a hook member movable in the central member for holding the center of a knot in the cavity and a handle at the other end of the hook member for axially moving the hook member in and out of the cavity.

5 Claims, 7 Drawing Figures

3 TURNS

KNOT TYING IMPLEMENT

BACKGROUND OF THE INVENTION

1. Field of the Invention

This invention relates to hand held implements for tying loop-forming knots on leaders of fishing line.

Because of the resiliency of the gut used for the leader material making knots with it is fairly difficult. In the past, fairly complex implements have been proposed which include a number of relatively movable parts that can fail to function properly.

2. State of the Art

The art to which this invention relates already is aware of the following U.S. Pat. Nos. 3,043,615; 2,601,605; 2,726,468 and 2,236,781. The structures described in the referenced patents do not suggest the combination of a slidable loop-holding hook with leader holding side members.

SUMMARY OF THE INVENTION

The principal object of this invention is to provide a device or article of this character which combines simplicity, strength and durability in a high degree, together with inexpensiveness of construction.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, wherein like reference character identify the same or like parts:

Figure 1:
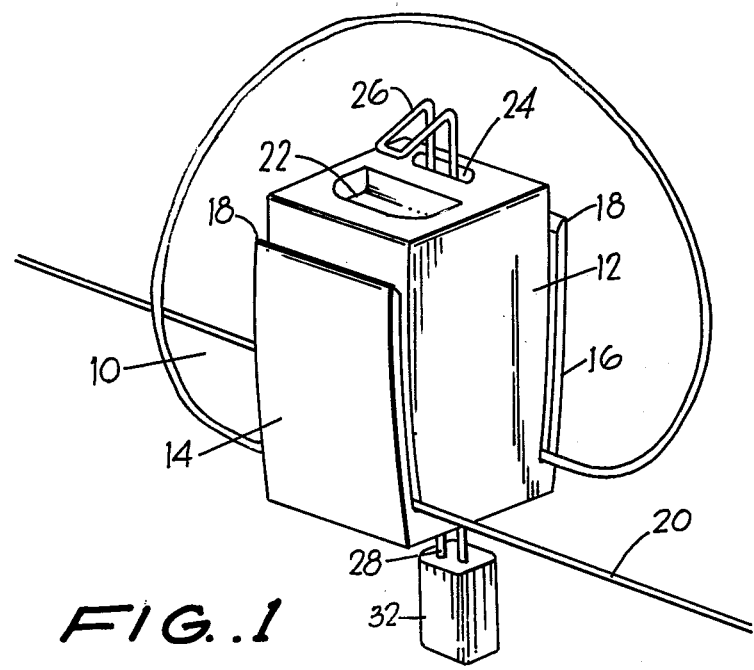
FIG. 1 is a perspective view showing an implement embodying the features of the invention and the first in making a knot with this implement.
Figure 2:
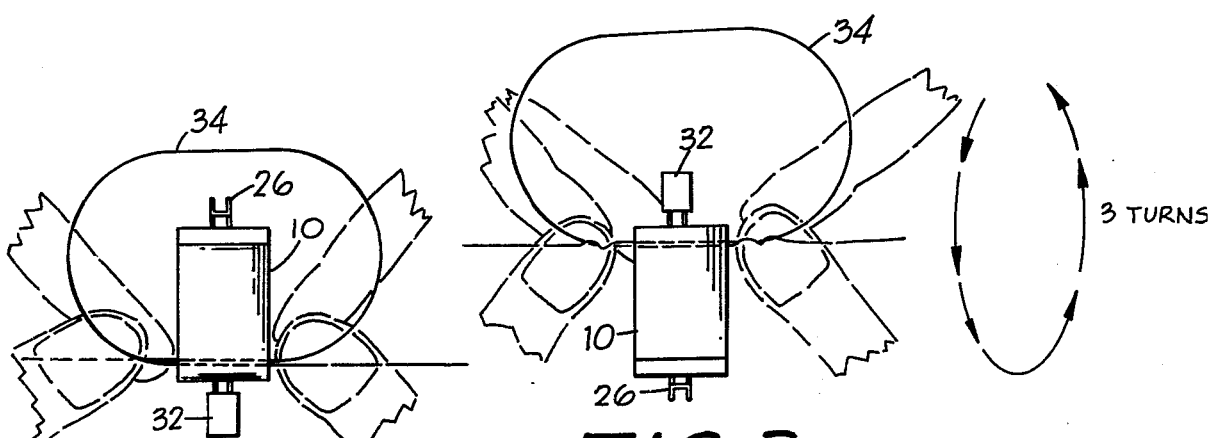
FIG. 2 is a front elevational view of the implement showing also the second step in making the knot.

With reference to the drawing, there is shown and illustrated a knot tying implement constructed in accordance with the principles of the invention and designated generally by reference character 10.

As shown in FIG. 1, the device includes a central, generally rectangular solid body of wood or molded from plastic which can be 1 ⅛ inch long and ½ inch wide. Integral therewith or secured to opposite sides of body 12 are gripper blades 14 and 16 spaced from the body by deep slots 18 which hold leader or gut 20 therein. In the top of body is formed a rectangular cavity 22. A longitudinal bore 24 is pierced in body 12 through which is passed axially movable knot holder or hook 26 formed by downturning folded metal rod 28.

Figure 7:
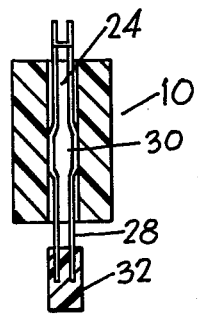
FIG. 7 is a cross-sectional view taken along line 7—7 of FIG. 1.

As shown in FIG. 7, rod 28 has its central part 30 slightly wider than opening 24 so as to be frictionally held therein and not move loosely. The ends of rod 28 are embedded in a handle member 32 of plastic or rubber about ½ inch long.

Figure 3:
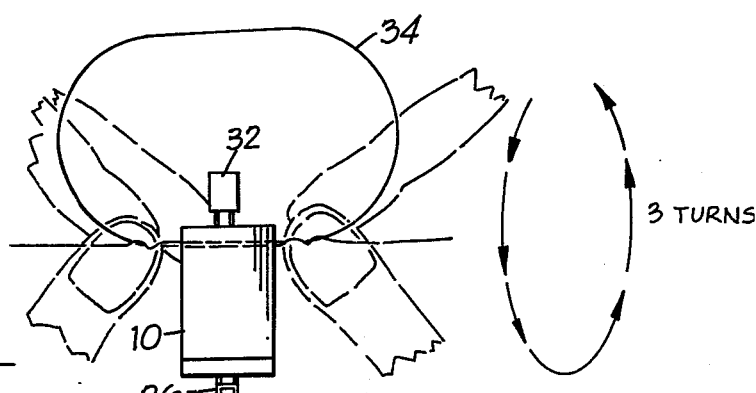
FIG. 3 is a front elevational view of the implement showing the third step in making the knot.
Figure 5:
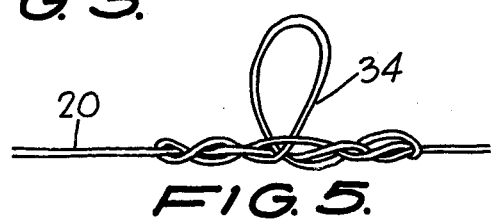
FIG. 5 is the finished knot.
Figure 4:
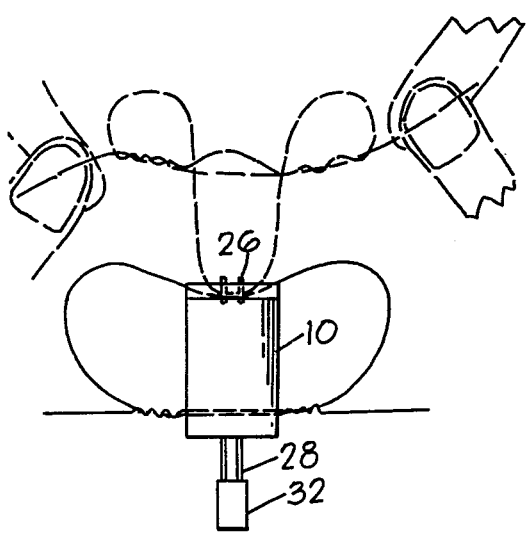
FIG. 4 is a front elevation showing the final step in forming the knot.
Figure 6:
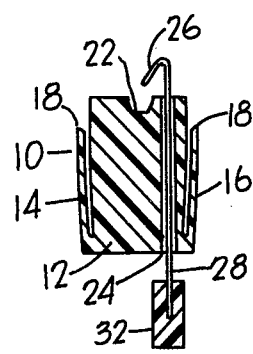
FIG. 6 is a cross-sectional view of the implement taken along line 6—6 of FIG. 1.

The use of the implement is illustrated in FIGS. 1 – 5. As shown on FIG. 1, the leader 20 is inserted in each slot 14 and 16. A full loop 34 is formed by holding the ends of the loop with the thumb and index fingers. Then the device is twisted 3 times as shown in FIG. 3. Then by pulling on handle 32 hook 26 is made to bring the center of the knot within cavity 22 as shown in FIG. 4. While the knot is in the position shown by dotted lines in FIG. 4 the ends are pulled to tighten and finish knot 34 shown in FIG. 5.

The implement of the invention is very easy to use even by persons who have not previously tied fishermen's knots of this type.

The device of the invention has been thoroughly tested under actual use conditions and has been found to be completely successful for the accomplishment of the above stated objects of the invention.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention I claim as new and desire to secure by Letters Patent:

1. Knot tying implement comprising a body having a longitudinal bore therethrough; a cavity formed axially in the upper part of said body for receiving the center portion of a knot; gripper means attached to the opposite sides of said body and forming strand receiving slots for holding a strand of leader against said body and for forming a loop from said strand around said body; a hook member axially movable in said bore and having a hook portion extending above said upper part of said body for holding said center portion of said knot in said cavity while said knot is being tightened and finished by pulling on the ends of said strand.

2. The implement of claim 1, wherein said gripper means consist of thin gripper blades integral with the lower part of said body.

3. The implement of claim 1, wherein said hook member consists of a bent rod having a downturned upper portion forming said hook and an actuating handle at the lower end of said rod.

4. The implement of claim 3, wherein said hook member has a widened central portion intermediate said hook and said end whereby said member frictionally fits in said bore.

5. The implement of claim 1, wherein said body is generally rectangular.

* * * * *